United States Patent
Muzzarelli

[19]

[11] Patent Number: 5,863,579
[45] Date of Patent: Jan. 26, 1999

[54] PLANT AND METHOD FOR COAGULTING PASTEURIZING AND COOKING FOOD

[75] Inventor: Gabriele Muzzarelli, Casinalbo, Italy

[73] Assignee: Farmer Engineering Gesellschaft m.b.H., Vienna, Austria

[21] Appl. No.: 875,488

[22] PCT Filed: Jan. 9, 1996

[86] PCT No.: PCT/EP96/00053

§ 371 Date: Sep. 29, 1997

§ 102(e) Date: Sep. 29, 1997

[87] PCT Pub. No.: WO96/21348

PCT Pub. Date: Jul. 18, 1996

[30] Foreign Application Priority Data

Jan. 10, 1995 [IT] Italy ................................ MO95A0002

[51] Int. Cl.⁶ ............................. A01J 25/00; A23C 19/00
[52] U.S. Cl. ............................. 426/231; 99/334; 99/348; 99/452; 99/453; 99/460; 99/468; 99/483; 426/36; 426/582
[58] Field of Search ...................... 99/348, 334, 452–455, 99/460–464, 466, 468, 483; 62/342, 343, 346; 165/122, 125, 140, 92, 148, 153, 161, 163, 104.19, 85, 87, 109.1; 366/230, 231, 144–146, 147; 426/231, 233, 36–40, 512, 518, 516, 582, 523

[56] References Cited

U.S. PATENT DOCUMENTS

| | | |
|---|---|---|
| 612,106 | 10/1898 | Hill ....................................... 99/453 X |
| 1,984,956 | 12/1934 | Anglim ..................................... 99/453 |
| 2,494,637 | 1/1950 | Stine ..................................... 99/453 X |
| 3,465,439 | 9/1969 | Wakeman . |
| 3,541,687 | 11/1970 | Peters ........................................ 99/453 |
| 3,585,721 | 6/1971 | Wakeman . |
| 3,683,500 | 8/1972 | Latapy . |
| 3,859,906 | 1/1975 | Bratland ................................... 99/460 |
| 3,918,356 | 11/1975 | Fischer .................................... 99/452 |
| 4,014,383 | 3/1977 | Stolt ........................................ 165/95 |
| 4,125,634 | 11/1978 | Plaskett .................................. 426/231 |
| 4,321,860 | 3/1982 | Hazen ................................... 99/462 X |
| 4,603,623 | 8/1986 | Le Guen et al. ......................... 99/454 |
| 4,902,523 | 2/1990 | Fritchen et al. ..................... 426/582 X |
| 4,964,333 | 10/1990 | Bravo ....................................... 99/455 |
| 4,994,287 | 2/1991 | Granberg et al. ....................... 426/231 |
| 5,470,595 | 11/1995 | Kopp et al. ......................... 426/582 X |
| 5,529,795 | 6/1996 | Aldrovandi ............................. 426/231 |
| 5,555,796 | 9/1996 | Kortschot et al. .................... 165/92 X |
| 5,711,976 | 1/1998 | Abler ....................................... 426/36 |

FOREIGN PATENT DOCUMENTS 0136224  4/1985  European Pat. Off. ......... A01J 25/00
1591109  6/1970  France .

Primary Examiner—Timothy F. Simone
Attorney, Agent, or Firm—Steinberg & Raskin, P.C.

[57] ABSTRACT

A plant and method for coagulating, pasteurizing and cooking food having a liquid or pasty base including a plurality of stations, devices for implementing a processing step on the food in each station, at least one container into which the food to be processed is initially placed, and devices for enabling the container(s) to be successively positioned in the stations to thereby subject the food in the container(s) to processing by the processing devices in the stations. The processing device in at least one station includes a variable-speed dynamic radial heat exchanger for affecting the temperature of the food.

20 Claims, 2 Drawing Sheets

# PLANT AND METHOD FOR COAGULTING PASTEURIZING AND COOKING FOOD

FIELD OF THE INVENTION

This invention relates to a coagulation and/or pasteurization and/or cooking plant for food substances, and in particular a cheese and/or ricotta-making plant.

BACKGROUND OF THE INVENTION

Various types of batch or continuous coagulation plants are known, each being designed specifically for a particular type of cheese. A typical example of this specialization is a plant for producing grana cheese DOC (controlled origin name) such as reggiano parmesan, grana padano and the like which, being obtained from crude milk, does not require a milk pasteurization section upstream, as in the case of a plant for mozzarella, stracchino or taleggio production. Other examples are the various plants for producing cooked or raw cheeses. In the case of reggiano parmesan, montasio, pecorino sardo, provolone and similar cheeses, the curd, after coagulation and cutting, has to be cooked at various temperatures and for various times depending on the type of cheese. Other examples are specific plants for mozzarella, taleggio, stracchino and the like, in which there is no cooking section.

Even today, specific plants for each individual type of cheese are built and used. Hence a cheese dairy is able to produce only those types of cheese allowed by the installed plants, so that if a cheese dairy contains only plants for reggiano parmesan production it is unable to produce mozzarella, stracchino or taleggio, and likewise a taleggio cheese dairy can never produce reggiano parmesan or gran padano cheese because its plants and equipment do not allow it. Consequently a characteristic of cheese dairy plants of the known art is their production rigidity. Even continuous coagulation plants, of more recent appearance on the market, have the same limitation, which in fact is even more restrictive as they possess no flexibility at all. In this respect, in addition to being able to produce only the specific type of cheese for which they have been designed, they have a rigid hourly productivity. Such plants are also limited to coagulation plus cutting and partial drainage of the curd.

An example of the known continuous plants for producing soft cheese is the apparatus for coagulating liquid-milk products as disclosed in U.S. Pat. No. 3,918,356. The apparatus comprises: a circular trackway having smoothy surfaced rails; a plurality of wheel frames positioned on wheels that overlie and travel on said circular trackway, said wheel frames being rigidly linked to each other; a corresponding number of identical container or vats that are pivotally mounted to said wheel frames and a tipping means intermediate said wheel frames and said vats to allow each vat to be independently tipped relative to the respective wheel frame; a filling station comprising overhead means relative to said vats for the addition of liquid milk product and coagulations agents to said vats; a cutting station comprising overhead cutting means relative to said vats that is moveable and insertable into each vat for cutting curd as it coagulates; a discharge station comprising a discharge chute positioned circumferentially about said circular trackway for receiving the whey and coagulated curd formed from at least two adjacent vats, said chute extending in a downwardly direction from an upper end where the whey and curd are received from said vats, to a lower end to which the whey and curd is transported; and a drive means for sequentially displacing said wheel frames over said circular trackway in predetermined spaced time relationship at constant velocity from said filling station to said cutting station to said discharge station.

An example of the known continuous plants for producing soft cheese is the apparatus for coagulating liquid-milk products as disclosed in U.S. Pat. No. 3,918,356. The apparatus comprises: a circular trackway having smoothy surfaced rails; a plurality of wheel frames positioned on wheels that overlie and travel on said circular trackway, said wheel frames being rigidly linked to each other; a corresponding number of identical container or vats that are pivotally mounted to said wheel frames and a tipping means intermediate said wheel frames and said vats to allow each vat to be independently tipped relative to the respective wheel frame; a filling station comprising overhead means relative to said vats for the addition of liquid milk product and coagulations agents to said vats; a cutting station comprising overhead cutting means relative to said vats that is moveable and insertable into each vat for cutting curd as it coagulates; a discharge station comprising a discharge chute positioned circumferentially about said circular trackway for receiving the whey and coagulated curd formed from at least two adjacent vats, said chute extending in a downwardly direction from an upper end where the whey and curd are received from said vats, to a lower end to which the whey and curd is transported; and a drive means for sequentially displacing said wheel frames over said circular trackway in predetermined spaced time relationship at constant velocity from said filling station to said cutting station to said discharge station.

OBJECTS AND SUMMARY OF THE INVENTION

These objects are attained by the plant of the present invention, comprising: a plurality of stations (A, B, C, D, E and F), each station provided with devices (15; 16; 16, 17; 18, 19; 19,16; 18 respectively) for implementing a determined processing stage, a variable-speed dynamic radial heat exchanger being provided in the stations in which a heat exchange is required; and means for enabling a container (22), into which the food substance to be processed is initially fed, to be successively positioned in correspondence with the various stations (A, B, C, D, E and F) for executing the required process.

A further object of the present invention is to provide cheese dairies with a plant and production process providing considerable versatility of utilization to the extent of enabling any type of cheese to be produced, and comprising not only a coagulation and breakdown section but also pasteurization, cooking and reheating sections.

A further object of the invention is to drastically reduce plant investment costs, and to be able to produce that type of cheese which at that particular moment is economically the most advantageous for the market.

A further object of the invention is to provide a plant which is easy and economical to use without the need to employ specialized labor or complex techniques, so enabling the technician to maintain product typicality without having to undergo special plant training.

Said objects are attained by the plant of the present invention, comprising:

plurality of stations (A, B, C, D, E and F), each station being provided with devices (15; 16; 16, 17; 18, 19; 19,16; 18 rispectively) for implementing a determined processing stage, a variable-speed dynamic radial heat exchanger being provided in the stations in which a heat exchange is required; and means for enabling a container (22), into which the food substance to be processed is initially fed, to be successively positioned in correspondence with the various stations (A, B, C, D, E and F) for executing the required process.

It should be noted that the stations can be fixed and the containers containing the substance to be processed, such as milk or whey, be movable, or the containers can be fixed and the stations be movable, or both the containers and stations can be movable.

BRIEF DESCRIPTION OF THE DRAWINGS

The invention will be more apparent from the description of one embodiment thereof given hereinafter. In this description reference is made to the accompanying drawings, in which.

DETAILED DESCRIPTION OF THE PREFERRED EMBODIMENTS

With reference to said figures, the plant according to the present invention comprises: a monorail 10 on which the various operating stations A, B, C, D, E and F are movably installed, all provided with lifting means 13. The lifting means 13 carry a relative fixing means 14, to which various devices for implementing a determined processing stage, for example proportioning devices, heat exchangers, agitators and other dairy equipment, can be fixed.

Figure 3:
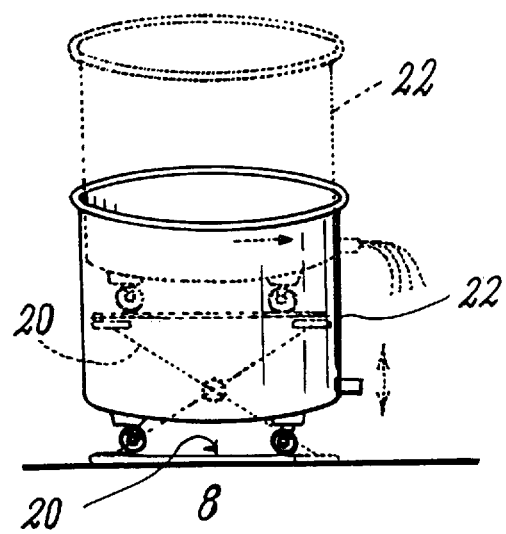
FIG. 3 is a schematic view of a container of the plant of FIG. 1 in the situation in which it appears on reaching the last station (F) of the plant.

Specifically, in station A, coinciding with position 1 (FIG. 1) a proportioning device 15 of known type, provided with a level regulator for filling the first container 22, is fixed to the fixing means 14, which consists basically of a horizontal plate connected to the relative lifting means 13. To the plate 14 of station B (coinciding with position 2) there is flanged a variable-speed dynamic radial heat exchanger 16 (in this respect see Italian patent application MO093A000005 and PCT/EP95/03062 both in the name of the present applicant). In station C (coinciding with position 3), to the plate 14 of a first lifting means 13 there is flanged a further variable-speed dynamic radial heat exchanger 16, on the plate 14 of a second lifting means 13 there being installed a double proportioning device 17. The stations D and E (positions 6 and 7 respectively) are both provided with double lifting means 13 with relative plates 14. On the first plate 14 of station D there is installed a variable-speed agitator 18 and on the other plate 14 a variable-speed curd knife 19. On the first plate 14 of station E there is also installed a variable-speed curd knife 19 and to the other plate 14 there is flanged a further variable-speed dynamic radial heat exchanger 16. A variable-speed agitator 18 is installed on the plate 14 of station F (position 8). At station F (FIGS. 1 and 3) there is provided a device 20 for lifting the container 22, the lifting device 20 being shown in its maximum extended position in FIG. 1, the container 22 when in this situation being shown dashed in FIG. 3.

From FIGS. 1 and 2, it can be seen that a pneumatically or mechanically operated bar or chain 21 of pawl type intermittently moves the containers 22 through one station (as indicated by the series of arrows below the containers), but only when the lifting devices 13 are in their upper end-of-travel position.

The plant according to the present invention operates briefly as follows when used for cheese-making from milk. At commencement of processing with the plant at rest, all the stations have their processing devices raised and at rest. On commencing processing, in position 1 the lifting means 13 of station A causes the proportioning device 15 to descend in order to fill the container 22 in position 1 as far as the predetermined level. On attaining this level the proportioning device 15 ceases to feed milk to the container 22, is closed and is raised by the lifting means 13 into the rest position. The pawl bar or chain 21, driven by appropriate drive means (not shown), is now operated to shift all containers 22 through one position. Consequently that container 22 which was in position 1 passes to position 2 (in correspondence with station B) and so on, until the last container 22, which was in position 8 (station F), passes to position 1 (station A). The container 22 now in position 1 is filled while at the same time in position 2 the dynamic radial heat exchanger 16 of station B is immersed into the relative container 22 by operating the corresponding lifting means 13. The dynamic radial heat exchanger 16 raises the temperature of the milk contained in said container 22 to the preset pasteurization temperature, after which the lifting means 13 raises the heat exchanger 16 into its rest position. At this point the chain 21 again moves the turntable containing the containers 22 through one position, so that the heated milk in the container 22 previously in position 2 is now in position 3 (station C). At this point the already described operations are repeated in positions 1 and 2, whereas in position 3 the dynamic radial heat exchanger 16 of station C is lowered by the relative lifting means 13 to cool the milk to the required coagulation temperature.

Figure 1:
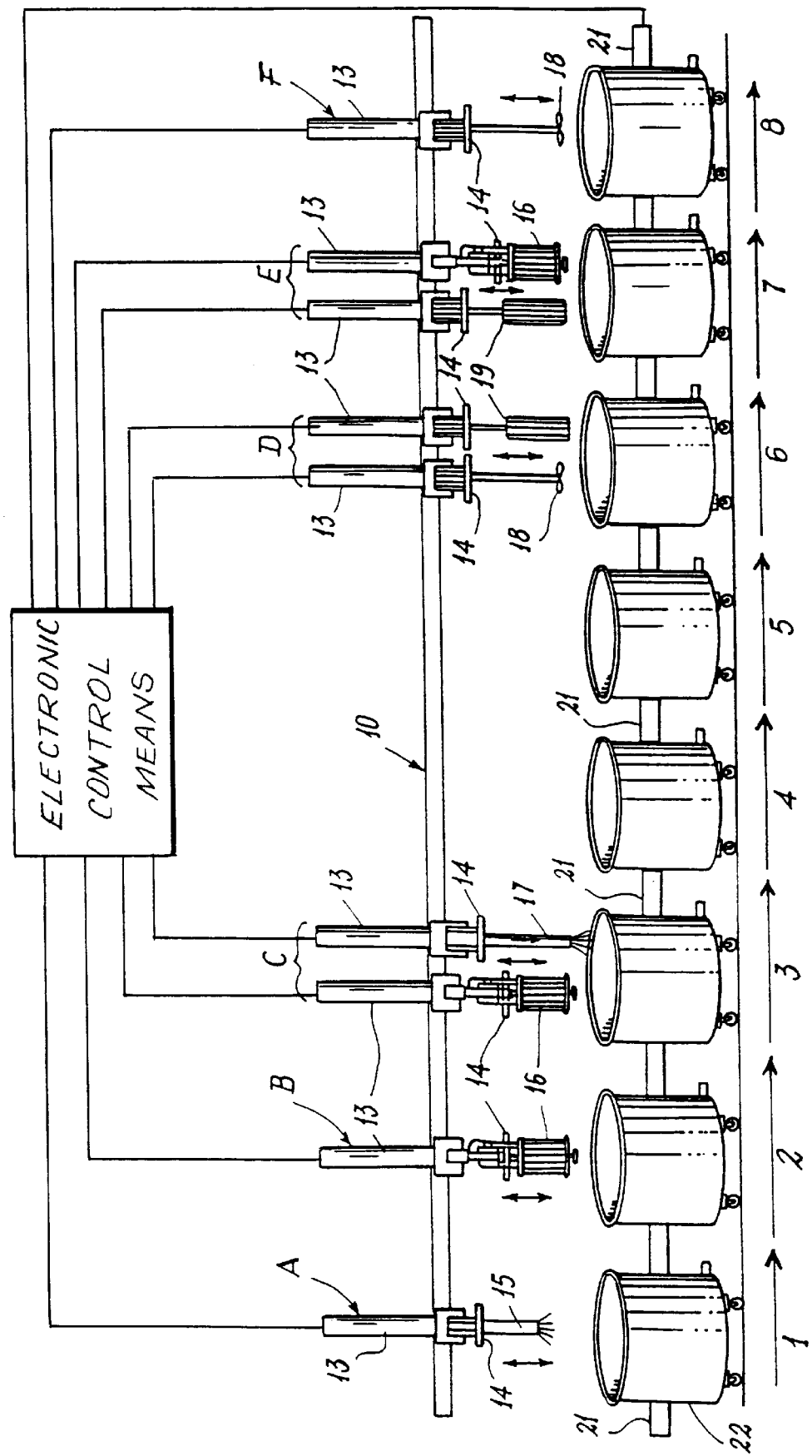
FIG. 1 is a schematic representation of the plant according to the present invention, shown extended in length and provided with six stations (A, B, C, D, E and F) and eight positions (indicated by Arabic numerals), which is particularly suitable for milk coagulation.
Figure 2:
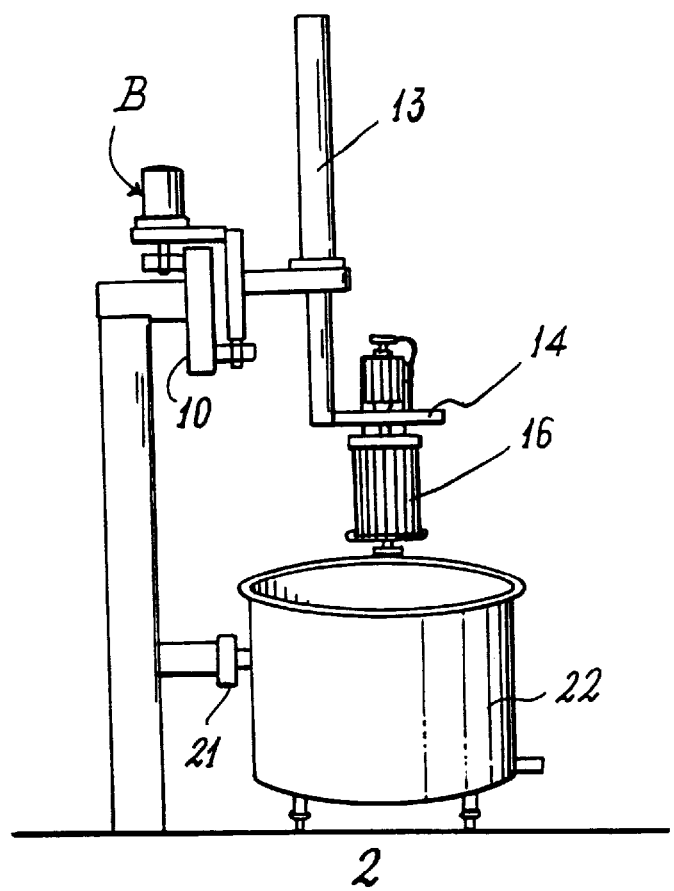
FIG. 2 is an enlarged schematic view of a particular intermediate station of the plant (station B), observed from a different viewpoint than FIG. 1.

As shown in FIG. 1, the lifting means 13 and the drive means of the pawl bar or chain 21 are controlled by electronic control means which, as is conventional in the art, include a microprocessor device.

During this temperature decrease, the double proportioning device 17, which is lowered by the relative lifting means 13, feeds the required milk ferments into the corresponding container 22 at the required temperature, and then feeds the curding liquid into the milk. When the two lifting means 13 of stations A, B and C have raised the relative processing devices, the pawl chain 21 shifts the containers 22 through a further position. Specifically the container 22 which was in position 3 passes into position 4, which is a rest position allowing the coagulum or caseins to set. When the operations in positions 1, 2 and 3 have terminated, the pawl chain 21 again shifts the containers 22 through a further position, so that the container 22 in position 4 passes to position 5, which is a further casein setting position. When the usual processes in positions 1, 2 and 3 under the control of the relative stations have terminated, the pawl chain 21 again shifts the containers 22 through one position, to bring the container 22 previously in position 5 into position 6 (station D), where the lifting means 13 immerse into the container 22, in succession, the curd knife 19 for cutting the curd and the agitator 18 for maintaining the contents under agitation even when the curd knife 19 has ceased to act and has been withdrawn. The agitator 18 is withdrawn after a predetermined time, enabling the pawl chain 21 to shift the container 22 previously in position 6 into position 7 (station E). The already described operations are repeated by the relative stations in positions 1, 2, 3 and 6, whereas in position 7, simultaneously with final curd cutting by the curd knife 19, the dynamic radial heat exchanger 16 of station E cooks the curd granules of the required dimensions at the required temperature.

When the various processing devices have been withdrawn from the relative containers 22, the pawl chain 21 again shifts the containers 22 through one position, to move that previously in position 7 into position 8 (station F). In this latter position the relative lifting means 13 lowers the agitator 18 to maintain the curd agitated in the whey while the containers 22 are emptied, either by raising (FIG. 3) or by suction by means of a pump. When the container 22 has been completely emptied and the agitator 18, preferably provided with known spry balls, has been withdrawn, the pawl chain 21 shifts the empty washed containers 22 so that the container in position 8 is moved into position 1, the cycle then being repeated as described or with technical variations to produce another type of cheese or ricotta. It should be noted that the same result can be achieved by maintaining the containers 22 at rest and shifting the stations with their relative processing devices.

As will be apparent, in the aforedescribed plant the cheese-making processes take place in the six containers located in positions 2, 3, 4, 5, 6 and 7, with the exclusion of positions 1 and 8 which serve respectively for filling the containers and for emptying and washing them. On the basis that the average residence time in each position is about 10 minutes, any cheese-making process can be completed in about one hour.

It should be noted that the aforedescribed cheese-making procedure is the most complex, comprising every possible cheese-making process. The flexibility of the plant however enables a different cheese-making procedure to be programmed by varying the succession of operations from position 2 to position 7.

The plant production rate depends on the capacity of the containers 22.

In this respect, if the containers 22 have a capacity of 600 liters, the hourly production is 3600 liters. If instead the containers 22 are of double capacity, ie 1200 liters, the hourly production is 7200 liters. A production run of eight hours would therefore treat 28800 liters of milk in the first case and 57600 liters of milk in the second case.

It should be noted that the plant of the present invention can also process milk mixed with other substances, for example corn or maize meal, and in the limit can be used for making polenta, goulash or minestrone, for example by feeding water and maize meal or the respective ingredients into the container 22 in position 1, cooking it in position 7 and discharging it in position 8, without using the other positions.

In the limit each container could be used for different preparations than those of the other containers (for example, milk could be fed into one container for cheese-making, water and maize meal into another container, water and chopped vegetables into a third container for minestrone, and so on).

It should also be noted that the plant of the invention is conveniently controlled and programmed by conventional electronic control means, for example one or more microprocessor devices.

I claim:

1. A plant for coagulating, pasteurizing and cooking food having a liquid or pasty base, comprising:

a plurality of stations, processing means for implementing a processing step on the food in each of said stations, said processing means in at least one of said stations comprising a variable-speed dynamic radial heat exchanger for affecting the temperature of the food, at least one container into which the food to be processed is initially placed, and positioning means for enabling said at least one container to be successively positioned in said stations to thereby subject the food in said at least one container to processing by said processing means in said stations.

2. The plant of claim 1, wherein said stations are fixed and said at least one container is movable.

3. The plant of claim 1, wherein said stations are movable and said at least one container is fixed.

4. The plant of claim 1, wherein said station comprises six stations, said processing means in a first one of said stations comprising a proportioning device and lifting means for moving said proportioning device relative to said at least one container when in said first station, said proportioning device being arranged to fill said at least one container when in said first station with milk or whey;

said processing means in a second one of said stations comprising a variable-speed dynamic radial heat exchanger and lifting means for moving said heat exchanger relative to said at least one container when in said second station, said second station thus constituting said at least one station, said processing means in a third one of said stations comprising a variable-speed dynamic radial heat exchanger, first lifting means for moving said heat exchanger relative to said at least one container when in said third station, a double proportioning device and second lifting means for moving said double proportioning device relative to said at least one container when in said third station, said double proportioning device being arranged to feed said at least one container with milk ferments and curding liquid when in said third station, said processing means in a fourth one of said stations comprising a variable-speed agitator, first lifting means for moving said agitator relative to said at least one container when in said fourth station, a variable-speed curd knife and second lifting means for moving said curd knife relative to said at least one container when in said fourth station, said processing means in a fifth one of said stations comprising a variable-speed curd knife, first lifting means for moving said curd knife relative to said at least one container when in said fifth station, a variable-speed dynamic radial heat exchanger and second lifting means for moving said heat exchanger relative to said at least one container when in said fifth station, and said processing means in a sixth one of said stations comprising a variable-speed agitator and first lifting means for moving said agitator relative to said at least one container when in said sixth station, further comprising means for emptying said at least one container of its contents when in said sixth station and means for cleaning said at least one container after it has been emptied.

5. The plant of claim 4, wherein said at least one container comprises eight containers, further comprising a train of said eight containers shiftable intermittently between eight positions, a first one of said positions coinciding with said first station, a second one of said positions coinciding with said second station, a third one of said positions coinciding with said third station, fourth and fifth one of said positions being rest positions with which no station corresponds, a sixth one of said positions coinciding with said fourth station, a seventh one of said positions coinciding with said fifth station and an eighth one of said positions coinciding with said sixth station.

6. The plant of claim 5, wherein said positioning means comprise a pawl chain connected to said eight containers and drive means for driving said pawl chain to thereby move said containers.

7. The plant of claim 4, wherein said stations are mounted on a monorail and are movable along said monorail.

8. The plant of claim 1, wherein said processing means and said positioning means are controlled by electronic control means.

9. The plant of claim 8, wherein said electronic control means comprise at least one microprocessor device.

10. The plant of claim 1, wherein said processing means in at least one of said stations comprise a proportioning device and lifting means for moving said proportioning device relative to said at least one container when in said station, said proportioning device being arranged to fill said at least one container when in said station with milk or whey.

11. The plant of claim 1, wherein said processing means in said at least one station comprise lifting means for moving said heat exchanger relative to said at least one container when in said station.

12. The plant of claim 1, wherein said processing means in said at least one station further comprise first lifting means for moving said heat exchanger relative to said at least one container when in said station, a double proportioning device and second lifting means for moving said double proportioning device relative to said at least one container when in said station, said double proportioning device being arranged to feed said at least one container with milk ferments and curding liquid when in said station.

13. The plant of claim 1, wherein said processing means in at least one of said stations comprise a variable-speed agitator, first lifting means for moving said agitator relative to said at least one container when in said station, a variable-speed curd knife and second lifting means for moving said curd knife relative to said at least one container when in said station.

14. The plant of claim 1, wherein said processing means in said at least one station further comprise a variable-speed curd knife, first lifting means for moving said curd knife relative to said at least one container when in said station and second lifting means for moving said heat exchanger relative to said at least one container when in said station.

15. The plant of claim 1, wherein said processing means in at least one of said stations comprise a variable-speed agitator and first lifting means for moving said agitator relative to said at least one container when in said station.

16. A process for coagulating, pasteurizing and cooking food having a liquid or pasty base, comprising the steps of:

providing a plurality of stations, placing the food in at least one container, implementing a processing step on the food in said at least one container in each of said stations, said processing step being implemented in at least one of said stations comprising the step of engaging a variable-speed dynamic radial heat exchanger with the food in said at least one station in order to affect the temperature of the food, and successively positioning said at least one container in said stations to thereby successively subject the food in said at least one container to the processing step being implemented in each of said stations.

17. The method of claim 16, wherein the step of successively positioning said at least one container in said stations comprises the step of maintaining said stations in a fixed position and moving said at least one container into and out of said stations.

18. The method of claim 16, wherein the step of successively positioning said at least one container in said stations comprises the step of maintaining said at least one container in a respective fixed position and moving said stations relative to said at least one container.

19. The method of claim 16, further comprising the step of movably mounting said stations on a monorail.

20. The method of claim 16, further comprising the step of controlling said processing step in each of said stations and said positioning step by electronic control means.

* * * * *

UNITED STATES PATENT AND TRADEMARK OFFICE
CERTIFICATE OF CORRECTION

PATENT NO. : 5,863,579
DATED : January 26, 1999
INVENTOR(S) : Gabriele MUZZARELLI It is certified that error appears in the above-identified patent and that said Letters Patent is hereby corrected as shown below:

On the title page, item [54]:

--PLANT AND METHOD FOR COAGULATING PASTEURIZING AND COOKING FOOD--

Column 1, line 1, change "COAGULTING" to --COAGULATING--

Signed and Sealed this

Sixth Day of July, 1999

*Attest:*

Q. TODD DICKINSON

*Attesting Officer*     Acting Commissioner of Patents and Trademarks